US008308540B1

(12) United States Patent
Hedge, Jr. et al.

(10) Patent No.: US 8,308,540 B1
(45) Date of Patent: Nov. 13, 2012

(54) NO DEALER HAND "21"

(76) Inventors: J. Richard Hedge, Jr., Chandler, AZ (US); Aviva R. Hedge, Chandler, AZ (US)

( * ) Notice: Subject to any disclaimer, the term of this patent is extended or adjusted under 35 U.S.C. 154(b) by 292 days.

(21) Appl. No.: 12/798,864

(22) Filed: Apr. 13, 2010

(51) Int. Cl.
*A63F 13/00* (2006.01)
*A63F 1/18* (2006.01)

(52) U.S. Cl. ................ 463/12; 463/16; 463/22; 463/25; 273/138.1; 273/139; 273/292; 273/306

(58) Field of Classification Search ............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309; *A63F 13/00, 1/18*
See application file for complete search history.

(56) References Cited

U.S. PATENT DOCUMENTS 5,769,422 A * 6/1998 Stromer ........................ 273/274
5,788,241 A * 8/1998 Ung ............................. 273/292

* cited by examiner

*Primary Examiner* — Arthur O. Hall

(57) ABSTRACT

The applicants' provide a process for playing "No Dealer Hand" Blackjack/Twenty-One. As such, the uses of, or display of, at least one common deck of Fifty-Two cards is being applied in play action. This process is inclusive to either an encompassing video gaming apparatus or a live action table gaming environment, as accommodated for. In play action, the dealer's hand is replaced with the application of Trigger Numbers, ranging anywhere from Twelve (12) up to Twenty (20), and optional Push Numbers ranging anywhere from Twelve (12) up to Twenty (20). Through such an application, the applicants' present a more mathematically malleable "core margin percentage variance" being afforded for exploitation by Housemasters. Likewise, the mathematical mechanics supporting this broader core margin percentage variance is made possible while simultaneously applying a seamlessly familiar playing experience for patrons. In so doing, the applicants' Trigger & Push Number solutions replacing the Dealer's hand in play action, proffers a whole new frontier for their "Twenty-One" gaming procedure. Indeed, this procedure directly features significantly fatter core margin payoffs for winning hand tallies from the game's Primary & Secondary "Base" or Secondary "Propositions" play actions while still providing for all the necessary elements of a sustainable alternative to the classic Blackjack workhorse for which the public can enthusiastically embrace.

16 Claims, 13 Drawing Sheets

*Fig. 6a*

COUNSEL I

*HOW TO PLAY:*

Players book contract wagers. Players are dealt Two (2) cards one at a time.
Next, winning hands are settled immediately.
Otherwise, players may draw cards until their best possible hand is made to "Stand Pat".

*RULES:*

Players can "Surrender" for a resulting "Stand off".
No Surrender "On the Trigger". No "back-to-back Surrender".
No Surrender after Third (3rd) card is drawn. No Surrender upon a "Newly Progressed" wager.
Players lose "Ante" wager Side-bets when Surrendering.
Players can Split any paired cards: Once per hand.
Players can Double Down on: Any Two (2) cards.
Players can Double Down on any Split cards: One (1) card to Ten's & Ace's.

All hand count tallies "Standing Pat" *short* of the First (1st) Trigger Numbers being used are "Sacked".
All hand count tallies *over* Twenty-One (21) are "Busted".

*SIDE-BETS:*

All first Two (2) card, "Ante" type side-bet wagers are displayed tableside
with their scales for "Bonus Payoffs".
All first Three (3) card, "Ante" type side-bet wagers are displayed tableside
with their scales for "Bonus Payoffs".

*PRIMARY "BASE" PLAY ACTION:*
WINNING & PUSH HANDS, STANDING "PAT"

*PRIMARY PUSH NUMBER FOR THIS "BASE" PLAY ACTION IS: 19*

*PRIMARY TRIGGER NUMBERS FOR THIS "BASE" PLAY ACTION ARE: 17 & 18*

*WINNING NUMBER TALLY'S:*

IF: Players "Stand Pat" with a hand of: BLACKJACK. THEN: Players are "Winners".
SO: Players are paid: 2 to 1 or 3 to 2 if, "TWENTY-ONE" is tallied with three or more cards.

IF: Players "Stand Pat" with a hand of: TWENTY. THEN: Players are "Winners".
SO: Players are paid: 6 to 5 on Ace+9/TWENTY or 1 to 1 on all other hand tallies totaling: TWENTY.

*PUSH NUMBER TALLY'S:*

IF: Players "Stand Pat" with a hand of: NINETEEN. THEN: Players "Push".
SO: Players don't win or lose.

*(CONTINUED IN FIG. 6b)*

*Fig. 6b*

*TRIGGER NUMBER TALLY'S:*

IF: Players "Stand Pat" with hand of: "18". THEN: Players are "On the Trigger".

SO: Players lose: 50% of their contract wagers on "18".

IF: Players "Stand Pat" with hand of: "17". THEN: Players are "On the Trigger".

SO: Players lose: 50% of their contract wagers on "17".

*LOSING HAND TALLY'S:*

IF: Players draw a hand count tally of: 12 thru 16. THEN: players are "Sacked".

SO: Players lose: 100% of their *total* contract wager. Players are "Busted" over 21.

*SECONDARY "BASE" PLAY ACTION:*
DOUBLING DOWN & DOUBLING ON SPLIT CARDS

*SECONDARY PUSH NUMBER FOR THIS "BASE" PLAY ACTION IS: 19*

*SECONDARY TRIGGER NUMBERS FOR DOUBLE DOWN ACTIONS ARE: 16-17-18.*

*WINNING NUMBER TALLY'S:*

IF: Players draw to "Double Down" hand of: TWENTY ONE. THEN: Players are "Winners".

SO: Players are paid: 3 to 2.

IF: Players draw to "Double Down" hand of: TWENTY. THEN: Players are "Winners".

SO: Players are paid: 1 to 1.

*PUSH NUMBER TALLY:*

IF: Players draw to "Double Down" hand of: NINETEEN. THEN: players "Push".

SO: players don't win or lose.

*TRIGGER NUMBER TALLY'S:*

IF: Players draw 3rd card to: "18". THEN: Players lose: 50% of their *total* wager.

IF: Players draw 3rd card to: "17". THEN: Players lose: 50% of their *total* wager.

IF: Players draw 3rd card to: "16". THEN: Players lose: 60% of their *total* wager.

*LOSING HAND TALLY'S:*

IF: Players draw a hand count tally of: 12 thru 15. THEN: players are "Sacked".

SO: Players lose: 100% of their *total* contract wager. Players are "Busted" over 21.

Fig. 7a

COUNSEL II

*HOW TO PLAY:*

Players book contract wagers. Players are dealt Two (2) cards one at a time.
Next, winning hands are settled immediately.
Otherwise, players may draw cards until their best possible hand is made to "Stand Pat".

*RULES:*

No "Surrender".
Players can "Split" any paired cards: As opportunity allows for.
Players can "Double Down" for "Base" or "Propositions" play action: Any Two (2) cards.
Players can Double Down on any Split-table cards: One (1) card to Ten's & Ace's.
Players can Multi-Down on Secondary "Propositions" play action: For Double & Triple Down payoffs.
Players can Multi-Down on any Split-table cards: One (1) card to Ten's & Ace's.

All hand count tallies "Standing Pat" *short* of First (1st) Trigger Numbers being used are "Sacked".
All hand count tallies *over* Twenty-One 21 are "Busted".

*SIDE-BETS:*

All first Two (2) card, "Ante" type side-bet wagers are displayed tableside
with their scales for "Bonus Payoffs".
All first Three (3) card, "Ante" type side-bet wagers are displayed tableside
with their scales for "Bonus Payoffs".

*PRIMARY "BASE" PLAY ACTION:*
WINNING HANDS; PUSH HANDS & STANDING "PAT"

*NO "PUSH" NUMBERS IN USES.*

*PRIMARY TRIGGER NUMBERS FOR THIS "BASE" PLAY ACTION ARE: 17 & 18*

*WINNING NUMBER TALLY'S:*

IF: Players "Stand Pat" with a hand of: BLACKJACK. THEN: Players are "Winners".
SO: Players are paid: 2 to 1 or 3 to 2 if, TWENTY ONE is tallied with three or more cards.

IF: Players "Stand Pat" with a hand of: TWENTY. THEN: Players are "Winners".
SO: Players are paid: 1 to 1.

IF: Players "Stand Pat" with a hand of: NINETEEN. THEN: Players are "Winners".
SO: Players are paid: 50% of their contract wagers on NINETEEN.

*(CONTINUED IN FIG. 7b)*

*Fig. 7b*

*TRIGGER NUMBER TALLY'S:*

IF: Players "Stand Pat" with hand of: "18". THEN: Players are "On the Trigger".
SO: Players lose: 50% of their contract wagers on "18".

IF: Players "Stand Pat" with hand of: "17". THEN: Players are "On the Trigger".
SO: Players lose: 50% of their contract wagers on "17".

*LOSING HAND TALLY'S:*

IF: Players draw a hand count tally of: 12 thru 16. THEN: players are "Sacked".
SO: Players lose: 100% of their *total* contract wager. Players are "Busted" over 21.

*SECONDARY "BASE" PLAY ACTION:*
DOUBLING DOWN & DOUBLING ON SPLIT CARDS.

*SECONDARY "PUSH" NUMBER FOR THIS "BASE" PLAY ACTION IS: 19*

*SECONDARY "TRIGGER" NUMBERS FOR DOUBLE DOWN ACTIONS ARE: 17 & 18*

*WINNING NUMBER TALLY'S:*

IF: Players draw to "Double Down" hand of: TWENTY ONE. THEN: Players are "Winners".
SO: Players are paid: 3 to 2.

IF: Players draw to "Double Down" hand of: TWENTY. THEN: Players are "Winners".
SO: Players are paid: 1 to 1.

*PUSH NUMBER TALLY:*

IF: Players draw to "Double Down" hand of: NINETEEN. THEN: players "Push".

SO: players don't win or lose.

*TRIGGER NUMBER TALLY'S:*

IF: Players draw 3rd card to: "18". THEN: Players lose: 50% of their *total* wager.

IF: Players draw 3rd card to: "17". THEN: Players lose: 50% of their *total* wager.

*LOSING HAND TALLY'S:*

IF: Players draw a hand count tally of: 12 thru 16. THEN: players are "Sacked".
SO: Players lose: 100% of their *total* contract wager. Players are "Busted" over 21.

*(CONTINUED IN FIG. 7c)*

*Fig.7c*

*<u>SECONDARY "PROPOSITIONS" PLAY ACTION:</u>* *5%* *COMMISSION PAYABLE ON WINNERS*
DOUBLING DOWN & DOUBLING DOWN ON SPLIT CARDS

*SECONDARY "PUSH" NUMBER FOR "PROPOSITION" PLAY ACTION IS: 19*

*SECONDARY "TRIGGER" NUMBER FOR "PROPOSITION" PLAY ACTIONS IS: 18*

*<u>WINNING NUMBER TALLY'S:</u>*

IF: Players draw to "Double Down" hand of: TWENTY ONE. THEN: Players are "Winners".
SO: Players are paid: 2 to 1.

IF: Players draw to "Double Down" hand of: TWENTY. THEN: Players are "Winners".
SO: Players are paid: 6 to 5.

*<u>PUSH NUMBER TALLY:</u>*

IF: Players draw to "Double Down" hand of: NINETEEN. THEN: players "Push".

SO: players don't win or lose.

*<u>TRIGGER NUMBER TALLY:</u>*

IF: Players draw 3rd card to: "18". THEN: Players lose: 50% of their *total* wager.

*<u>LOSING HAND TALLY'S:</u>*

IF: Players draw a hand count tally of: 12 thru 17. THEN: players are "Sacked".
SO: Players lose: 100% of their *total* contract wager. Players are "Busted" over 21.

*<u>SECONDARY "PROPOSITIONS" PLAY ACTION:</u>* *5%* *COMMISSION PAYABLE ON WINNERS*
TRIPLING DOWN & TRIPLING DOWN ON SPLIT CARDS

*SECONDARY "TRIGGER" NUMBER FOR TRIPLE DOWN ACTIONS ARE: 19*

*<u>WINNING NUMBER TALLY'S:</u>*

IF: Players draw to "Triple Down" hand of: TWENTY ONE. THEN: Players are "Winners".
SO: Players are paid: 2 to 1.

IF: Players draw to "Triple Down" hand of: TWENTY. THEN: Players are "Winners".
SO: Players are paid: 3 to 2.

*<u>TRIGGER NUMBER TALLY:</u>*

IF: Players draw 3rd card to: "19". THEN: Players lose: 50% of their *total* wager.

*<u>LOSING HAND TALLY'S:</u>*

IF: Players draw a hand count tally of: 12 thru 18. THEN: players are "Sacked".
SO: Players lose: 100% of their *total* contract wager. Players are "Busted" over 21.

*Fig.8a*

COUNSEL III

*HOW TO PLAY:*

Players book at least one (1) electronic contract wager(s). Two (2) cards are then revealed for hand at play.

Next, winning hands are settled immediately.

Otherwise, players may draw cards for each hand until their best possible hand tally is made to "Stand Pat".

*RULES:*

Players can "Surrender" for a resulting "Stand off".

No Surrender "On the Trigger". No "Back-to-Back" Surrender.

No Surrender after Third (3rd) card draw. No Surrender upon a "Newly Progressed" wager.

Players lose "Ante" Side-bets when Surrendering.

Players can "Split" any paired cards. Players can "Double Down" on: Any Two (2) cards.

Players can Double Down on any Split-table cards: One (1) card to Ten's & Ace's.

Players can Multi-Down on Secondary "Propositions" play action: For Double & Triple Down payoffs.

Players can Multi-Down on any Split-table cards: One (1) card to Ten's & Ace's.

All hand count tallies "Standing Pat" *short* of the First (1st)Trigger Numbers being used are "Sacked".

All hand count tallies *over* Twenty-One 21 are "Busted".

*SIDE-BETS:*

All first Two (2) card, "Ante" type side-bet wagers are displayed on monitors along with their scales for "Bonus Payoffs".

All first Three (3) card, "Ante" type side-bet wagers are displayed on monitors along with their scales for "Bonus Payoffs".

*PRIMARY "BASE" PLAY ACTION:*

WINNING HANDS; PUSH HANDS & STANDING "PAT"

*PRIMARY "PUSH" NUMBER FOR THIS "BASE" PLAY ACTION IS: 18*

*PRIMARY "TRIGGER" NUMBERS FOR THE "BASE" PLAY ACTION ARE: 16 & 17.*

*WINNING NUMERS TALLY'S:*

IF: Players "Stand Pat" with a hand of: BLACKJACK. THEN: Players are "Winners".

SO: Players are paid: 200% over their wager on a 2/card "BLACKJACK" and,

150% over their wager on a "TWENTY-ONE", when made with three or more cards.

IF: Players "Stand Pat" with a hand of: TWENTY. THEN: Players are "Winners".

SO: Players and are paid: 100% over their wager on a 2/card "TWENTY" and,

120% over their wager on a "TWENTY", when made with three or more cards.

IF: Players "Stand Pat" with a hand of: NINETEEN. THEN: Players are "Winners".

SO: Players are paid: 50% over their wager on a "NINETEEN".

*(CONTINUED IN FIG. 8b)*

*Fig.8b*

*PUSH NUMBER TALLY:*

IF: Players "Stand Pat" with a hand of: 18. THEN: Players "Push".

SO: Players don't win or lose on "18".

*TRIGGER NUMBER TALLY'S:*

IF: Players "Stand Pat" on a hand of: "17". THEN: Players are "On the Trigger".

SO: Players lose: 50% of their wager on a "17".

IF: Players "Stand Pat" on a hand of: "16". THEN: Players are "On the Trigger".

SO: Players lose: 60% of their wager on a "16".

*LOSING HAND TALLY'S:*

IF: Players "Stands Pat" on a hand count tally of: 12 thru 15. THEN: players are "Sacked".

SO: Players lose: 100% of their *total* contract wager. Players are "Busted" over 21.

*SECONDARY "BASE" PLAY ACTION:*
DOUBLING DOWN & DOUBLING ON SPLIT CARDS

*SECONDARY "PUSH" NUMBER FOR "BASE" PLAY ACTION IS: 18*

*SECONDARY TRIGGER NUMBERS FOR "BASE" PLAY ACTION IS: 17*

*WINNING NUMBERS TALLY'S:*

IF: Players draw to "Double Down" hand of: TWENTY ONE. THEN: Players are "Winners".

SO: Players are paid: 150% over their wager on a TWENTY ONE, when made with three cards.

IF: Players draw to "Double Down" hand of: TWENTY. THEN: Players are "Winners".

SO: Players and are paid: 100% over their wager on a 2/card TWENTY and,
120% over their wager on TWENTY when made with three or more cards.

IF: Players draw to "Double Down" hand of: NINETEEN. THEN: Players are "Winners".

SO: Players are paid: 25% over their wager on a NINETEEN, when made with three cards.

*PUSH NUMBER TALLY:*

IF: Players draw 3rd card to: "18". THEN: Players "Push" on all booked wagers.

*TRIGGER NUMBER TALLY:*

IF: players draw 3rd card to: "17". THEN: Players lose: 50% of their *total* wager.

*LOSING HAND TALLY'S:*

IF: Players draw a hand count tally of: 12 thru 16. THEN: players are "Sacked".

SO: Players lose: 100% of their *total* contract wager. Players are "Busted" over 21.

*(CONTINUED IN FIG. 8c)*

*Fig.8c*

*<u>SECONDARY "PROPOSITIONS" PLAY ACTION:</u>* *5%* *COMMISSION PAYABLE ON WINNERS*
DOUBLING DOWN & DOUBLING DOWN ON SPLIT CARDS

*SECONDARY "PUSH" NUMBER FOR "PROPOSITION" PLAY ACTION IS: 19*

*SECONDARY "TRIGGER" NUMBER FOR "PROPOSITION" PLAY ACTIONS IS: 18*

*<u>WINNING NUMBER TALLY'S:</u>*

IF: Players draw to "Double Down" hand tally of: TWENTY ONE. THEN: Players are "Winners".

SO: Players are paid: 200% over their *total* contract wager.

IF: Players draw to "Double Down" hand tally of: TWENTY. THEN: Players are "Winners".

SO: Players are paid: 120% over their *total* contract wager.

*<u>PUSH NUMBER TALLY:</u>*

IF: Players draw to "Double Down" hand of: NINETEEN. THEN: players "Push".

SO: players don't win or lose.

*<u>TRIGGER NUMBER TALLY:</u>*

IF: Players draw 3rd card to: "18". THEN: Players lose: 50% of their *total* wager.

*<u>LOSING HAND TALLY'S:</u>*

IF: Players draw a hand count tally of: 12 thru 17. THEN: players are "Sacked".

SO: Players lose: 100% of their *total* contract wager. Players are "Busted" over 21.

*<u>SECONDARY "PROPOSITIONS" PLAY ACTION:</u>* *5%* *COMMISSION PAYABLE ON WINNERS*
TRIPLING DOWN & TRIPLING DOWN ON SPLIT CARDS

*SECONDARY "TRIGGER" NUMBER FOR TRIPLE DOWN ACTIONS ARE: 19*

*<u>WINNING NUMBER TALLY'S:</u>*

IF: Players draw to "Triple Down" hand of: TWENTY ONE. THEN: Players are "Winners".

SO: Players are paid: 200% over their *total* contract wager.

IF: Players draw to "Triple Down" hand of: TWENTY. THEN: Players are "Winners".

SO: Players are paid: 150% over their *total* contract wager.

*<u>TRIGGER NUMBER TALLY:</u>*

IF: Players draw 3rd card to: "19". THEN: Players lose: 50% of their *total* wager.

*<u>LOSING HAND TALLY'S:</u>*

IF: Players draw a hand count tally of: 12 thru 18. THEN: players are "Sacked".

SO: Players lose: 100% of their *total* contract wager. Players are "Busted" over 21.

NO DEALER HAND "21"

CROSS-REFERENCE TO RELATED APPLICATIONS

This application is related to application of record; Ser. No. 61/067,429 filed; 28 Feb. 2008, That is related to this application of record; Ser. No. 12/082,464 filed; 11 Apr. 2008.

FIELD OF INVENTION

This invention relates to games of chance as historically identified with wagering in casinos.

The applicants' methods and modifications are inclusive to both a variety of live action table gaming formats as well as electronic display applications for play of all types. Their inventive process utilizes at least one common deck of Fifty-two (52) playing cards or the electronic simulation of the like to be specific. Also, the present invention utilizes a process formulated upon the "absence of a Dealer hand" throughout the game's course of play.

In action, this absence of a dealer hand is without precedent to the traditional/classic play of Blackjack in all of its present day forms and permutations. In so teaching, the applicants' methods proffer a whole new paradigm of opportunity for "21" play within the applicants' applied industry of casino gaming. Moreover, a quick, simplistic method of card play is provided for players looking for a fun, entertaining time wherein a reasonable chance of winning may be had.

Presently, the applicants' know of no previously established methodologies regarding either "live action" table game embodiments of Blackjack/21, including those banked by a House (casino) or electronic "virtual reality" display methods of Blackjack/21 either with or without dealers, which are presently under Patent enforcement or otherwise that might be construed as teaching on or reading upon their concepts and process of play.

DESCRIPTION OF PRIOR ART

Blackjack is a centuries old game and historically a premier table game in American casinos as well as casinos across the world. No doubt there is good reason for this. America and the world love card games and they know this game—Blackjack!

Actually, it's a love/hate relationship; just ask anyone who plays the game. People love to play Blackjack especially when the cards give, and of course, take. But no one in any language enjoys getting slaughtered when the dealer stays so "hot" that just simply nothing the player does is right!

So, before the disclosure of the applicants' alternative methodologies, a basic discussion regarding Blackjack's traditional play along with its terminology and historical trends is useful in teaching the applicants' inventive process as described and illustrated further below. Simply put, the objective in traditional Blackjack is to beat the dealer's hand. This is accomplished by having a totality of cards that tally higher than the dealer's cards without going over Twenty-one (21).

The card values in Blackjack are as follows; cards Two (2) through Ten (10) are tallied at face value while "Face cards" are valued at Ten (10) and Aces are valued at Eleven (11) or One (1). Likewise, from here forward, the term "Ten card" will define both Ten (10) cards and/or Jack, Queen & King cards (a.k.a., Court cards).

Similarly, a "Blackjack" hand is always made up of the first two cards dealt. These cards being a Ten card and an Ace. The Blackjack hand is also referred to as a "Natural" or when made with Three (3) or more cards, a "21" and is just as generally unbeatable.

Although, the dirty fact of the game is that a dealer's dealt Blackjack hand will frequently drive a simultaneously dealt player's Blackjack hand into an even money decision or, at the very least, a "Push" stand off outcome for the players Blackjack hand, meaning the player's hand doesn't win or lose. Likewise, a dealer hand 21 made with Three (3) or more cards always Push, all other player hand 21's made with Three (3) or more cards as well. As a practical matter, a player can win with any total under 21 so long as the dealer "Busts" first.

Busting in Blackjack/21 is any final tally higher than Twenty-One (21) for either the player's or the dealer's hand. But unlike the dealer, players will experience the "Double Bust." The Double Bust occurs when players Bust-out first, followed by the dealer Busting.

It is this constant reality of the Double Bust which players are intractably facing in Blackjack that gives the casino its greatest most frequently exercised "House Percentage Advantage" (a.k.a., "Vig." or Vigorish) over the players. It is said that the dealer will Bust 28% of the time. However, only the players can experience the Double Bust because the players must act first!

All things being equal, Double Busting provides the House with a constant 5.7% advantage over the players when Double Busting occurs. Therefore, any way you play it within the confines of all "traditional dealer hand methods and rules" for playing Blackjack/21, there remains a powerful House advantage being exacted against all players within the traditional rules of Blackjack, which must be constantly evaded.

This House advantage is the Double Bust effect.

Additional aspects of traditional Blackjack play include the terminology of "Hard," "Stiff," "Soft" and "Pat" hands. A Hard hand is one that either does not have an Ace; 9-7/16 or if it does, it tallies as a One (1), 9-6-A/16. Typically, the Hard hand totaling Twelve (12) thru Sixteen (16) is also called a Stiff hand because it can easily Bust when drawing additional cards.

A Soft hand is one that has an Ace being tallied as Eleven (11) amongst the first Two (2) cards being dealt: A-6/17, A-7/18, A-8/19 or A-9/20. Regardless whether the player's hand stands made upon a Hard or Soft 17, 18, 19 or 20, such hands are thought of as Pat hands. The last two general strategies of traditional Blackjack play include card "Splitting" and/or "Doubling Down," both practices of which players are well advised to partake of though tableside restrictions will vary from House to House.

Most often when players engage the practice of card Splitting & Doubling down, the decision is simply weighed against the dealer's "Up-card". Should the dealer's Up-card be a Bust card; 2, 3, 4, 5 or 6, this often inclines the player to Split their paired cards, such as; 2's, 3's, 4's, -6's, 7's, 8's, 9's or Aces when they otherwise may not.

This scenario facilitates a great Splitting opportunity, or better yet as paired Aces reveal, a fantastic multiple Double Down action against a dealer's weak Up-card; although players may draw out as many cards as necessary in a normal card Splitting situation until they either Stand Pat or Busts! Similarly when Splitting Aces, many casinos allow only One (1) card for each Split Ace.

In further regards to Doubling Down, again it's a good idea to Double Down whenever the opportunity arises. Although, Doubling Down is sometimes restricted to a player's first Two (2) cards tallying Ten (10) or Eleven (11) only. Moreover, many restrictive rules especially those pertaining to Splitting & Doubling Down are put into place by Housemasters (casino management) as a means to maintain a desired core operating margin position for their Blackjack games, therein benefiting their casinos. Therefore, these rules will vary based on many subserviently subjective factors. Additional subservient factors are found within the "Insurance & Surrender" rules as historically applied.

Traditionally, Insurance is offered when the dealer's Up-card is an Ace. For the unwashed, Insurance is generally thought of as a "bad bet," but does protect the player's wager in the event the dealer has Blackjack with a Ten hole card. As for the traditional practice of the Surrender rule option (where it is still found), this rule enables the players to withdraw from the hand for half the original contract wager. This action is taken by player(s) when it's felt the dealer's hand is so strong (often repeating Up-card Tens & Aces) and, particularly when the player is holding a "15 or 16" stiff hand, that keeping half the original contract wager is clearly better than losing all of it.

In America today and throughout the world, Insurance is readily found as part of the Blackjack gaming scene where Surrender rules are not so readily found outside of Asia and Europe. The reasons are simple. Insurance is generally thought of as a bad wager for players to engage in, while Surrendering against continually "strong" dealer hand Up-cards is, in a few cases, a good idea.

Of course, the Surrender action as historically deployed assumes the player is not motivated to just simply get up and leave . . . .

The above background rendering of traditional Blackjack/21 rule play pretty much covers all the essential bases of Blackjack play, however certainly not all the "basics" of Blackjack play. As such, the applicants' are referring to the qualities of play employed through the application of the "Basic Strategy" play that are not developed herein.

Although, Basic Strategy play is written about in a great many topical books regarding Blackjack. In following, there are two reasons for not discussing Basic Strategy here. First and foremost, there are "No Dealer Hand" outcomes that impact upon the applicants' methodologies for play action. And secondly, any player who is fully immersed in the knowledge of Basic Strategy can easily adjust their play actions accordingly to whatever they see might apply to the applicants' process for play.

Having said this, there still remains the speculative issue of card counting as well as the dubious issue of "Ante" wager side betting that has so proliferated the world in recent years.

Card counting is the fastest growing somewhat "under the radar" trend of traditional Blackjack, a trend that is a "natural consequence" of the voluminous numbers of truly well rounded Basic Strategy players at large. Moreover, this encroaching advance against the rather thin House advantage of the traditional Blackjack game via the art of card counting, as spurred on through strong Basic Strategy knowledge, has become so pervasive in recent years that now every Basic Strategy wanting to be an "Advanced Strategy" player around thinks he can beat Blackjack for their weekend job working as card-counting extraordinaires!

However, as the truly strong "Advanced Strategy player" will tell you, there is a new and rather deleterious trend, in addition to the pre-requisite ability to accurately count down a deck of cards in less than 30 seconds, working around the Blackjack tables in Las Vegas and around the country which is to pay a Natural Blackjack at: 6 to 5 over the traditional Blackjack pay off of: 3 to 2.

A single act by Housemasters (that alone) makes beating the House in Blackjack even by a "Ken Uston," were he still alive, all but impossible. This "cynical" Blackjack payoff trend adds another 1.40% in the margin to the house's Vig-advantage where players actually play and tolerate this.

Worse yet, this surreptitiously defensive trend is spreading fast and will prove extremely disadvantageous to both the "stout Blackjack players" and the more "profligate too-smart-by-half type weekend players" alike!

Therefore, a general discussion regarding the salient points and trends of card counting is useful in understanding additional motivations of the applicants' modified methodologies. Effective card counting by way of the amateur or professional is steeped in process memorization, including the memorization of fixed strategy tables often referred to as indices to be specific.

For example, these indices are memorized strategies counseling within the minds-eye of a basic "Hi-Lo" single level trend count that provides the "edge" that bears the winning advantage so sought after by Blackjack connoisseurs.

The Hi-Lo trend count starts at zero upon a new shuffle of a single deck or multi-deck shoe. A shoe is the mechanism from which the dealer advances individual cards up to a multiple of Eight (8) decks of Fifty-Two (52) cards. Therefore, unlike Dice or Roulette, Blackjack is made up of a series of "dependent trials" culminating in hands. As such, each "card value" being seen affects the likely outcome of the next card and so on.

So, in assigning numeric count values to cards leaving the shoe, the low cards: 2, 3, 4, 5 or 6 are counted as +1 and all high cards: 10, J, Q, K & Ace are counted as −1. Wherefore, all 7, 8 & 9 cards are ignored being valued at "zero" in the basic Hi-Lo trend count method, while "multi-level" methodologies for example are significantly more cumbersome for the individual shoe Caser however, such methodologies once acquired are also known to be even more effective when a "deep penetration" of the shoe occurs.

Suffice it to say, on the one hand, it's been observed that for the "stout" Blackjack player the main purpose for acquiring the skill and confidence that card counting promises is to know when to "hit" to improve a Stiff hand or better yet, to pitch the dealer Bust cards. Although for the largely reckless card counter, what card counting is probably best suited for is avoiding the dreaded Double Bust effect, as well as evaluating both Insurance plays and Surrendering wherever allowed and whenever it's wise.

DESCRIPTION OF THE PRIOR ART

The fact is these skills alone will save "profligate" weekend players a bundle against a casino full of scorching hot dealers! On the other hand for today's professional, such basic skills would likely be closely augmented by more precise methodologies like the "Half-count" method, the HI-OPT and HI-OPT II method or the KO plus "Ace tracking" method, to name just a few, that most Blackjack card counting connoisseurs, Advanced Strategy players, esteem for assuming their mental acuity can remain sharp enough for a long enough session of time to make a difference.

In the end, the edge that quality card counting provides is that minds-eye intuitive impetus to "make the play," and for the very rare breed of gambler that strong pulling back counter intuitive perspective that can largely see ahead with 20/20 hindsight!

However, the collateral effects of card counting are summarily undone when either Basic or Advanced Strategy player mishaps occur . . . . Typically impacting somewhere up to 0.75% in the marginal advantage being sought, depending upon their frequency, and whereby the player's entire count effort will likely be made in vain.

Now, if this all sounds a bit over the top, maybe it is; and then again, maybe it is not . . .

After all, this is a game that now finds a growing number of single deck games paying Naturals at: 6 to 5.

Therefore, a significant "redress" for this old favorite could well prove most timely . . .

To this end, given the demanding yet fickle nature of Housemasters qualifying a comprehensive redress in the form of a new "top down" rendition for the traditional game of Blackjack will prove tricky. Casino games, especially well established games, evolve ever so slowly due to the rather strident change resistant nature of Housemasters where their table games are concerned.

Just look at Craps' "stats" for the last Twenty (20) plus years, or Hazard & Faro before that. What eventually dissipates as a game ages is the must have public's participation to maintain steady "drop values" (the player's cash buy-in) in significant enough numbers as to support a viable Win % value for the game's continued survival.

It is equally true that Housemasters must simultaneously "exercise & balance" their must have Vig-percentage advantage over their players in wide enough margins while achieving the most viable Win % value possible from the games they run.

In so achieving this result of the most viable Win % value possible, the hourly compellation of hands played is of paramount importance to Housemasters because the hourly decision stream working together with the established Vig-percentage advantage is the cause for all Win % results. As for traditional Blackjack, Forty to Sixty rounds per hour of operation for a full table of Six (6) players will keep a Dealer employed. Therefore, a companion gaming process, such as that of the applicants', promising a minimum "Ten (10) plus percent increase of hands" (decisions) per hour of operation is quite advantageous from the Housemaster's point of view. This assumes the House's Vig-advantage is being exercised & balanced just right for the public's attraction to play!

Another words, to accomplish this, any new gaming solution entering the casino floor must be very quick to learn and be "fat enough in the math" to allow frequent winners, while nurturing the necessary Win % value required for a productive bottom line Hold % for the casino.

Even though all this in itself is a tall order, a game design that meets these tests by the very basis of its methodology is a real plus, a real big plus!

The simple "rule of thumb" for a new game is; if a game's visual introduction can't first pass the "eye clutter" and, say the "beer test" (i.e., the game looks to intimidating), the public most likely won't play, so therefore the game's chances are very slim.

And of course, if a game's core Vig-percent advantage is too overbearing, the public won't play either so the game's chances are next to nil!

The Gaming industries foundation formula is:

Hold %=Win % divided by the Drop.

In recent years, a large number of "Side-bet" permutations have hit the Blackjack scene. A long view of Blackjack's numbers and performance would well reveal the significant influence of Basic Strategy training aids as published in so many books and table indices, as well as the impact of computer training aids and video games have had over time; thereby inducing the unending search for additional gaming revenues from this Blackjack workhorse.

Clearly, training aids have been a significant driving resource used by the public at large, perhaps a cause for which Housemasters' have been induced into making "margin reducing" rule changes along with their abiding results over the years.

Wherefore such rule changes, for the sake of a "competitive edge," have starved the very margins of the game. This has resulted in the shaving down of the working House Vig-advantage margins of traditional Blackjack to such an extent as to justify the uptake of so many Side-bet permutations as a means to "re-balance" the customary Drop, Win & Hold percentages of yesteryear from this perennial Blackjack workhorse. This thinking is also at work as a means to justify this insidious 6 to 5 Blackjack payoff exchange too!

For you see, this Side-bet trend of the last Twenty-five or so years has not only been about satisfying player boredom, as so many prior-art references state. It has also been about defending the traditional boundaries for which the casino's fixed House percentage advantage in the game "had" historically operated under in the now distancing past.

That is, a perceived House Vig-advantage approaching 6% that in recent decades, due to "margin binding rule changes" and "a gross historical miscalculation as to what 'Blackjack's core margin value' really was," has thinned down to about a 2% Vig. for those who have little if any knowledge of "Basic Strategy." This margin has been found to be as low as a −1.5% Vigorish impact against the house favoring the exceptionally well rehearsed card counter or card-counting team.

As such, traditional Blackjack's core operating Vigorish in the final analysis has been steadily pressured and splintered apart by a progressively wiser, yet still growing player population during this same almost generational period of time. Most Importantly, a great many of whom are at least proficient in Basic Strategy, which means the casino's Vig-advantage edge ranges from about 0.20 of One (1) % to about 0.65 of One (1) %.

Moving forward, it is a good bet that the shear numbers of new inexperienced players alone will likely not stave off continuing pressure upon traditional Blackjack's core margin to somehow produce a better result.

Indeed, as the applicants' know, it takes significant innovation to achieve such ends . . . A better result that is!

Who knows, maybe just around the corner, casino's might move even more defensively to paying off Naturals at say: Even Money, and without further recourse for players, thereby further bolstering their margins as a simplistic answer for achieving the greater revenue streams so needed from the games they offer.

From a historical perspective, this is not such a stretch. Clearly, certain prior-art "Blackjack permutation games" that are all about not losing . . . already do pay blackjack hands at: Even Money. And in further aggravation to this, a great many casinos have already moved to paying off their traditional pitch game "Blackjacks" at: 6 to 5.

So, what then is going to be the appeal for playing Blackjack moving forward?

Finally, there is yet one more set of hurdles to consider for a successful venture in the gaming business; the "fat enough in the math" hurdle, as previously alluded too. Moreover, this hurdle is the "major intersection" of several key issues that are given particular scrutiny and held foremost in the minds of Housemasters as they directly pertain to a new game's working House percentage-advantage edge, or Vig.

The commensurate action to this "fat enough in the math" hurdle is a hurdle conceptually known as "Time-In-Play," or TIP. In the casino business, the House's intentions are to part their customers from as much of their cash as possible, but not so fast as to leave them feeling fleeced or ripped-off.

Actually, Housemasters love winners because that is how they earn their money.

"Paying winners" . . . That's how Housemasters "earn on the chum" of play action!

The House always pays off winning wagers a "fraction short of a true odds payoff."

Hence you might say, even though a game's House advantage must necessarily favor the casino, the more sublime yet steady acting the House's Vigorish (as made inviolable to count methods), the better the opportunity for continuing the public's patronage, whereby the game can ultimately become a valuable asset for Housemasters.

Of course, a gambler's TIP is notwithstanding "his own ability" to do something really stupid . . .

BRIEF SUMMARY OF THE INVENTION

As will become quite clear, the applicants' are proffering an embodiment for playing "21".

However unlike classic Blackjack/21, the applicants' modified process for play action engages a No Dealer Hand approach. Players draw through a flow of cards from either real or simulated deck(s) or shoe(s) of cards until a decision to stand or busting upon the next card occurs. Assuming the player is not "Busted" or "Sacked" (loses), the player then stands for a percentage-loss "on the Trigger" or stands to "Push" or "Win" upon a winning outcome tally for their hand.

In any case, when "standing pat" upon a Trigger Number tally or standing pat upon a Winning Number tally, players are then exposed to a mathematically formulated and pre-determined scale for loss or payoff. Furthermore for the sake of clarity, the terms and depictions being used as illustrated within the exemplary counsels below are to be construed to substantially comprise the following: First, Primary and/or Secondary "level" play action "Trigger Numbers," (a.k.a., TN's). These numbers are any single and/or group/set of numbers spanning from Twelve (12) up to Twenty (20). Another words, any and/or all can be assigned to function as TN's.

Likewise, optional Primary and/or Secondary "level" play action "Push Numbers," (a.k.a., PN's) are also assigned play action as any single and/or group/set of numbers spanning from: Twelve (12) up to Twenty (20), as well; while "Winning Numbers" (a.k.a., WN's) are depicted and assigned to be any single and/or group/set of Primary and/or Secondary "level" of numbers spanning up to Twenty-One (21).

Furthermore, like traditional Blackjack, players of the No Dealer Hand methodology will also play out hand; "Splitting, Doubling Down & Split-Double Down" opportunities as Primary & Secondary "Base" actions for play, just as would be customary within the play action of the traditional game of Blackjack.

However, unlike the traditional game, the applicants' process for play action establishes a simultaneously accessible "parallel play action dynamic" of additional options being more broadly designated as the "Secondary Decisions." The Secondary Decisions represent a "fork in the road" of play so to speak, a choice player's have the option to make.

The applicants' methodologies offer players an "intensive menu of variable risk" for all Secondary play option action. As such, the implementation of the Secondary Decision choices of either Secondary "Base" play actions or Secondary "Propositions" play actions represent this "fork" of avenues for wagering consideration.

As for the Secondary Propositions, they play out in a similar manner as the Secondary "Base" Split-hand, Double Down & Split-Double Down hands do for play action, although for a much greater risk/reward play action payoff result!

Additionally, the applicants' Secondary Propositions play actions bear one more distinctive characteristic in that any players after seeing their first Two (2) cards for Split-hand or Third-card drawing opportunities are able to book "at least" a Double Down play action for their wagers. Indeed, many players will opt for "at least" a Triple Down play action from such Proposition play options, which is why the applicants' in the context moving forward, will identify the Secondary Propositions as "Secondary Proposition Multi-Down" wagers.

As for the electronic, wireless or otherwise means for play action, a player might well choose to play out each "Split-hand decision segment" upon a play action strategy wherein One (1) of each of the Split-hand(s) is wagered upon a "differing pay table of elevated risk" and all within the same round of play!

Similarly, as will be taught and latter claimed, there exists a great many possible play action embodiments for culminating the applicants' gaming modifications that are applicable, yet only a few of these embodiments will be cited for development as more exemplary counsels serving as the necessary disclosure hereto.

Therefore in reprise, traditional Blackjack is the most quintessential table game encompassing the psyche of the world's casino going experience. This is true even if you don't play the game. Almost nowhere will you go into a casino and not find Blackjack front and center to the play action!

Although over this last quarter century or so as new innovations for this perennial favorite have arrived on the scene, it is astonishing to the Applicants' that so few of the art's previously taught methodologies modifying classic Blackjack's play have seen to aggressively redress the compounding historical affects of this fast changing industry upon the Blackjack workhorse at large as the Applicants' do, herein. So, instead, the public is offered 6 to 5 payoffs for Blackjack games from eight (8) deck shoes offering no alternative recourse in play for the player(s) thereof.

At least, this is how the circumstances are viewed by the Applicants' and particularly, as one might strategically "tune up" this game for the purposes of recalibrating, and realigning, this game from its core mathematical vantage point given the ever growing and smarter player population that today, so exploits the thinned down margin circumstances historically playing out upon the classic game's core mathematical dynamic, as all previously developed and cited.

Of course, these historical and contemporary observations are notwithstanding the competitive, yet concertedly empirical "rule change" decisions of Housemasters' both good and bad alike from impacting the bottom lines of their own Blackjack games during this same generation, or so period of time as again aforementioned.

So from the applicants' perspective, there is an alternative to the present day thin-in-the-math "adversarial" circumstance for which traditional Blackjack has historically operated. Therefore by way of such a redress, the applicants' methodologies of "stripping out the Dealer hand effect" to engage their Trigger Number Solution in its place, clears the way for charting a new recourse for Blackjack style play action (i.e., making new rules) as well as establishing a new core mathematical dynamic (i.e., setting new payoffs) that is competently capable of moving in along side the traditional Blackjack franchise as a viable companion gaming option!

And as such, their alternative process therefore results in a more mathematically malleable House Vig-advantage working amidst its play. In that the applicants' balanced modifications deploy a never before applied synergy of "ameliorating consequences" by way of a wider "core margin variance" for casino's to work with. All of which is made possible through the abrogation of all the historically narrowing and binding effects of the adversarial mathematics that so systemically "chokes off" the traditional Blackjack methodology's ability to cultivate a more malleable working core margin advantage along with subsequently better payoffs for the player's consumption when playing the traditional game.

Similarly, the applicants' methodology of replacing the Dealer's hand in play action with their powerful "Trigger Number Solutions" operating within the play action of their game, so fundamentally broadens the mathematical margin being applied by way of the applicants' modifications that a richer statistical pool is the first ameliorating improvement from their process. This thereby allows for "fatter" payoff ratios, benefiting patrons without casting strenuous financial effects upon the House or worse yet, chasing off patrons with too strong of a core Vig-advantage.

For example, the applicants' No Dealer Hand gaming methodology establishes a core Vig-advantage of about 2% at its Base play action over its players, while simultaneously establishing said "richer statistical pool" (from the core margin) for paying much fatter payoffs to winning hands. As such, this roughly 2% House Vig-advantage over all players is more than three times that of the "assumed Basic Strategy player's results of frequently less than 0.49%," a circumstance for which most casinos will find advantageous.

Rule for rule, card for card, and to the payoffs, the applicants' methods reveal a profound mathematical shift being integrated from the core of their game, thereby benefiting everyone!

Most importantly, the applicants' modifications of removing the adversarial mathematics in support of having no "Dealer's hand" and supplanting said Dealers hand with their "Trigger Number solution," is by "de facto" the very inducement for the core statistical shift even being made possible. Likewise, this broader margin is made possible while simultaneously applying a seamlessly familiar playing experience for patrons. In addition to this, the House is advantaged by way of the dissimulation of the "collective mind" that is so commonly used by advanced players organizing against the Dealer's hand within the table gaming environment they occupy.

Meaning, in all too many Blackjack games these days, at least one of the six or so players is frequently a strong Basic Strategy player whose purpose is to use "polite banter" directly relating to the ongoing game to guide "any & all weaker players" as to the "what, when & how" of making the correct advantaged plays, thereby creating a better than otherwise collective outcome frequently by pitching Bust cards to the Dealer.

The ongoing result of this is a functioning House Vig-advantage aggregating much closer to 0.49%, rather than to the more robust productive end of the spectrum at about Two (2) plus percent, respectively. As applied to the applicants' play action methodology, banter of any kind has no real measurable affect in orchestrating anything for the obvious reason that there is No Dealer Hand to affect or play off of!

Therefore, if the House Vig-advantage is 1.78% or say, 1.31%, 0.96% or some portion of a flat 5% fee for that matter, then simply put, that's what it is for everyone who plays! Also, from the player's standpoint, the applicants' modifications remain simple requiring only routine knowledge and therefore mental engagement on the part of patrons to play and enjoy the game.

Likewise, patrons no longer face down the repeating Up-card Ten or Ace, the Double Bust effect or even the dreaded "Push" on what should have been a winning hand like Twenty, or worse yet, Twenty-one! Furthermore, for the first time in known history, Housemasters' can pay a "Blackjack" at 2 to 1, and a multi-card 21 at 3 to 2, at the "Base" play action of the same game, if they wish, without going broke.... This is what the applicants' mean by "fatter payoffs."

A Fifty percent improvement over the traditional game's historical payoffs for a Blackjack or multi-card 21 while in addition to this, players are usually guaranteed at least even money payoffs on all "Pat" outcome tallies of "Twenty" (20) projecting from the Primary Base and/or Secondary play action decisions of the applicants' gaming process when used as a Winning Number!

As for Nineteen (19), when used as a "Push Number," the House has a built-in a safe spot for players assuming the House uses Nineteen (19) as at least a PN, if not a Winning Number, rather than simply using Nineteen (19) as a Trigger Number, which housemasters' certainly can do.

As such, this significantly more malleable core margin Vig-advantage working within and from the applicants' "Initial and/or Base" action for play is a direct consequence of the applicants' fundamental insertion of their Primary Trigger Number solution into the process that so ameliorates a player's Time-In-Play too!

Another aspect of the applicants' methodology is the ability of Housemasters to "use and manipulate" the Primary & Secondary Base Trigger Number feature as required, meaning there are many pay tables from which to choose, whereby further massaging the applicants' gaming process for their casino's financial benefit. This is an achievement the traditional adversarial game of Blackjack with all of its underlying mathematics could never hope to orchestrate.

Additionally, play actions like Surrender can also be accommodated for, albeit, its application works a little differently than traditional Blackjack Surrender does.

And similarly as will be shown, several of the applicants' many possible Secondary "Propositions" play action pay tables being made operable from the game's core mathematical function are of a progressively intriguing persuasion of elevated risk and, all this, in addition to a broad collection of "Ante" wager types of side-bets (public & proprietary), which can easily become associated with the applicants' gaming formulations as Housemasters' see fit to deploy them.

OBJECTIVES AND ADVANTAGES

Accordingly, several objectives and advantages are clearly achieved by way of the applicants' method of having No Dealer Hand being applied throughout their process of play. First, regarding the "Table Game" process of play, the applicants' methodology calls for the complete abrogation and replacement of the "Dealer's Hand" in play.

The applicants' accomplish this through means of their Primary and/or Secondary Base Trigger Number effect, again defined as singular, grouped or sets of numbers, typically but not always preceding the Push and/or Winning Numbers as applied in the applicants' process for play. Trigger Numbers will range anywhere from: Twelve (12) up to Twenty (20) and can substantially "fluctuate" in their Initiating financial impact upon the players starting at the Primary Base action of the game for a couple of reasons.

One reason is due to the way the completed hands fallout from the shuffling mix of the cards or shoe, while another reason is more attributable to all Primary & Secondary Base and/or Secondary Proposition's play action Trigger Numbers in uses that may bear fluctuating "Vig." values as well. This fluctuating Vigorish does play a "freer roll" within the electronic transmission methods for play action as will be further developed below.

Furthermore, this fluctuating Vigorish is notwithstanding a decision by Housemasters to engage a flat fee percentage commission solution being grafted in as either an addition to the core mathematics' margin already at work, or as an application to both winning Primary and/or Secondary Base play action outcomes or again, just as applied to winning Secondary Propositions play action outcomes.

Similarly, decisions to engage only a commissionable percentage due fee solution for either an individual Primary or Secondary TN and/or WN selection, or as applied, to a range of Propositions TN's & WN's shall be further reviewed below.

As for the immediate fluctuating impact upon the players when Standing Pat on hand counts of Twelve (12) up to Twenty (20). Only the practical uses of monetary units (i.e., Chips), as applied to "live action" table gaming applications, along with the same widely accepted mathematical mechanics as to be applied to such live action play with such monetary units, as well as the commonly accepted mathematical mechanics for electronic gaming platforms shall be the guiding factors in determining the House Vig-advantage edge of a TN selection as they are applied from: Twelve (12) up to Twenty (20) and/or optional PN selections from: Twelve (12) up to Twenty (20), and typical WN selections of up to Twenty-One (21) in uses by Housemasters.

Additionally, Housemasters through both "live action" table gaming methods including organized tournaments as well as through electronically mechanized gaming equipment, inclusive to "third party" hand held wireless devices too, might well adopt a commissionable percentage due fee and/or point structure for a win/payment/prize application to winning wagers or point totals being accessed for payout/award from particularly, but not limited to, the applicants' Secondary Propositions play action options.

Clearly as one can already see, several differing yet cohesive aspects of the applicants' process for play action can arise among this range of numbers as being applied for play action from: Twelve (12) to Twenty-One (21), respectively. For example, if a given casino was to counsel the use of: Seventeen (17), as their first Primary Base selection of a TN being used, this would leave Standing Pat on every hand count "short" of Seventeen (17) as being "Sacked". Meaning the player loses their entire wager while each and every player hand count tally over Twenty-One (21) are Busted, therein losing their entire wagers too.

In even another example, if the Housemasters' counsel the Primary and/or Secondary Base Trigger Numbers to be: 16 thru 18, with 19 as a Primary and/or Secondary Base action Push Number and 20 & 21 as the Winning Numbers, then all player hands Standing Pat on Fifteen (15) or less, would be Sacked for a complete loss as well, and so on.

As a practical matter, this situation of getting Sacked will only occur when a player succumbs to Standing Pat with a hand count short of the established "first" Primary and/or Secondary Base play action TN or the Secondary Proposition's TN being used as with a short hand count tally from a weak Double Down and/or Multi-Down action, or a weak draw on Split Tens or Aces should players only be allowed One (1) card for each Split Ten or Ace.

Again by definition, a Sacked hand count within the realm of the applicants' process for play is any hand count that is not Standing Pat upon at least the first Trigger Number among the selected TN's being applied to the game, whatever they might be, Primary and/or Secondary Base TN's or Secondary Proposition TN's.

Therefore, beginning with the dealing of the cards, all players are dealt Two (2) cards up or down. Then starting with the person sitting at first base on the table, each player seeing the value of their present Two (2) card tally have fast decisions to make; do they "Surrender," "Draw" card(s), "Stand Pat," "Double Down" and/or "Split" their cards, including Splitting their cards for Double Down play action(s), all of which begin as Primary & Secondary "Base" play actions. Or, if perceived make able, do players assume the greater risk of the Secondary "Propositions" be they Split-Hand, Multi-Down or even "Multi-Down plays on a Split multiple of hand(s)" for their action.

In actual play action, such Secondary wagers move up onto a Proposition's wagering area readily identifiable upon any "No Dealer Hand 21's" game table layout whereby exposing their wager(s) and completed hand tallies to a significantly greater risk & reward pay table event!

The idea and application of the Secondary Propositions Multi-Down play action is to accommodate the applicants' unique ability to allow players to reach for the casino's "Chandeliers," as a multiplying down play action upon their first Two (2) card Base wagers or as culminating from at least an initial card Splitting opportunity, or again from Splitting Tens & Aces when electing to take One (1) and usually only One (1) card for such a Multi-Down action, wherein the player is typically hoping to draw to at least a Twenty (20), if not a Twenty-One (21) outright for payoff.

Should a player's first Two (2) cards tally to what are typically Winning Number's Twenty (20) or Twenty-One (21), such players are axiomatic winners and would "Stand Pat" for their winning payoffs or possibly opting to "Split their paired Ten cards" for a Split/Multi-Down play event in the case of an initial draw of a Two (2) card Twenty (20) as just inferred. Nevertheless, should a player's first Two (2) cards tally to what is less than the selected set of Primary Trigger Numbers (i.e., 16-17-18-19) for the table, players may then elect to Surrender and "Stand Off to a Push," meaning the player does not win or lose as Surrender is defined within the applicants' process of play.

Although, any established "Ante" wager Side-bets would most likely fall to the House as a consequence of exercising such a Surrender option. Likewise, the Surrender option may well prove subservient to additional factors like no "back-to-back" Surrender and/or no Surrendering on the "Trigger" range of numbers, in this case Sixteen (16) up to Nineteen (19), and/or no Surrender after a third card is drawn, or even to include, no Surrendering upon "newly progressed" (increased) wager(s) for example.

OBJECTIVES AND ADVANTAGES

Regarding a decision to draw cards, since the applicants' process for "21" play is unique in that if on the one hand, a player's first Two (2) cards tally less than the selected Primary Trigger Numbers (i.e., 17-18), players are then certainly compelled to draw at least One (1) card. This is due to the fact that a player's hand count lies in a Sacked condition at this point, and therefore the player will lose their entire wager on any standing tally of Sixteen (16) or less for this example.

This again assumes the player did not exercise their first Two (2) card Surrender option, which may have been available to them and is notwithstanding the player drawing to a Sixteen (16) or some other Sack numbers lying in wait to be applied in a Secondary "Base" Double Down play action or some other Secondary "Propositions" Multi-Down action the players may have made.

Once more, on the other hand, should a player's first Two (2) cards or any number of cards for that matter tally to; Sixteen (16), Seventeen (17), Eighteen (18) and Nineteen (19) which can often represent a typical selection of Primary Trigger Numbers being used for execution of the applicants' game, these players are then "hanging on the Trigger".

Surely, when players are caught hanging on the Trigger, they still will likely want to draw at least One (1) card due to the fact that Standing Pot on the Trigger will cause a player to lose a hefty portion of their contract wager presently at risk for the hand. Of course, the risk of Busting over Twenty-One (21) is confronting the players in this circumstance too, which instead would result in the complete loss of their wagers.

Also as previously inferred, an additional aspect of the applicants' methodology includes the process of Doubling & Multiplying Down on Ten (10) count(s), Eleven (11) count(s) or for that matter any Two (2) cards should the player wish to take the elevated risk of getting Sacked or busting as the circumstance may play out.

Albeit, the thrilling notion of making these unique Secondary "Base" or Secondary "Propositions" Multi-Down plays that payoff so much better for about the same degree of risk (see counsels below), as is the case playing out when wagering upon the applicants' Secondary Multi-Down play options, is a risk well worth taking! Clearly then, players may Split cards and Split-to-multiply Down on their card(s) whenever their cards allow and they feel compelled to do so.

Again, notwithstanding those subservient tableside restrictions!

In further development of the Trigger Numbers application at least within the applicants' Electronic processes for play, Housemasters' might well call for the "expansion or retraction" numerically of the TN affect, "even on the fly of action," either by including Sixteen (16) or say subtracting Seventeen (17). Or for example, loosening and/or tightening, "even on the fly of action," the application of the House's fluctuating Vig-advantage percentages for such TN's projecting from the Primary and/or Secondary selection of Trigger Numbers being applied as well as their winning payoff regimes. Clearly, such play options will likely operate in their greatest dynamic capacity as applied to the applicants' electronic applications.

Also, as previously discussed, any totality of Trigger Numbers anywhere from Twelve (12) up to Twenty (20), can be used to establish the Primary and/or Secondary Base play TN's as well as Proposition play action TN's being sought after. In addition, Housemasters might well see a reason to utilize numbers like Eighteen (18) and/or at least Nineteen (19) as optional Push Numbers, at least within the Primary and/or Secondary Base play action instead of using them as just Trigger Numbers.

The Primary Trigger Numbers in uses would then be 16, 17 or 18, or maybe just 17 & 18 respectively, along with their "biting Trigger values" for the House. Therefore, in this example, at least 17 & 18 are the Primary TN's while 19 is functioning as a Primary PN thereby leaving 20 & 21 as the WN's. Additionally and as aforementioned, a Secondary selection of Trigger Numbers from 12 up to 20 could also be used for Double Down and/or "higher risk" Multi-Down Proposition actions as well. Clearly then, allowing a Base Double Down or Propositions Multi-Down action on Split cards through an expanded range of Secondary Base and/or Proposition Trigger Number's anywhere from 12 up to 20, could well prove a compelling action for Housemasters to take both "with or without" the injection of an additional commissionable percentage fee Vigorish being applied.

Furthermore, it is by this very means of the applicants' Primary and/or Secondary Base and/or Secondary Proposition's Trigger Number feature along with their manipulations, and the payoffs made on WN's that the ameliorating power dynamic that so significantly transitions the House's advantage margin occurs. Likewise, either of the applicants' aforementioned Primary or Secondary Base and/or Secondary Proposition's play selections of TN's, whatever they are established to be 17 & 18, and 16, 17 & 18, or just simply 19 for that matter respectively, are also subject to an "adjustable" and fluctuating percentage for affect as also just delineated.

Meaning, each TN is either subject to the same static Vig-advantage affect in its individual/group number setting for play action (as will be commonplace for table gaming action), or players may realize a rising escalation or fading reduction of Vig-percentages affecting each individual TN number in its group setting by random electronic impulse, even as played out upon the fly of play action. Indeed, such options are particularly relevant to the applicants' many cumulative electronic applications.

However, even in the realm of "static" table play action, say a Primary Base selection of TN's: 16-17-18, all factor as a static 50% loss, or "Vig. affect," upon the players contract wagers when Standing Pat while a Secondary Base and/or Secondary Proposition's group of TN's affecting Base Split-hand, Double Down and/or Proposition Multi-Down actions might well bear a fading reduction or "Vig. affect," like: 60% on 16; 50% on 17; 40% on 18 respectively.

Or, for that matter, any number of productive solutions can be made to applied from expanding to retracting TN's, rising or fading Vig-percentages or just simply using fixed "static" techniques which are all processed within the same core calculation mechanics of the applicants' gaming formulations as made acceptable through widely held mathematical procedures, and as ultimately displayed upon the House's play option pay tables.

Therefore, it is directly through the applicants' replacement of the classic Blackjack "Dealer hand" method starting with that of their Primary & Secondary Base Trigger Number solution modification that opens up such a significantly improved core margin variance for exploitation, as once again aforementioned.

As such, the applicants' core solution provides a "whole new" outlook directly supporting fatter core payoffs from their Initial/base mathematical mechanics for play while still providing for all the necessary elements of a sustainable alternative to the classic Blackjack workhorse for which the public will enthusiastically embrace.

Furthermore, it is the principle objective of the present method for No Dealer Hand "21" to provide a wholly new gaming process dynamic while requiring only routine mental focus to enjoy a seamlessly familiar playing experience.

It is another principle objective of the present method for No Dealer Hand "21" to provide a wholly new paradigm of thought provoking play that competently coincides with accepted mathematical mechanics and procedures regarding applied probabilities of chance projecting from the applied "integrated core resource" of first the cards, along with their shuffle mix dynamic, and then their play action distribution.

It is another principle objective of the present method for No Dealer Hand "21" to provide a wholly new adaptation in the form of Primary Trigger Numbers establishing the Base consequence of play action that replaces both the action and function of the now "absent Dealer hand" in play.

It is another principle objective of the present method for No Dealer Hand "21" to provide for the engagement of Primary Base Trigger Numbers comprising any numbers from 12 up to 20 that can be expanded or retracted numerically to affect the House's core margin Vig-advantage from the applicants' Base process for play.

It is still another principle objective of the present method for No Dealer Hand "21" to provide for the uses of a Secondary Base set of play action Trigger Numbers comprising any numbers from 12 up to 20 that can be expanded or retracted numerically, as well as being loosen or tighten on a percentage basis, to effect the subsequent operational "win percentage values" for Split-hand and/or Double-Down actions from the applicants' Secondary Base option process for play.

It is still yet another principle objective of the present method for No Dealer Hand "21" to provide for the engagement of Trigger Numbers & Winning Numbers that can be expanded or retracted numerically, as well as loosen or tighten, even on the fly play action, upon an individual or group percentage basis, thereby supporting a rising or fading escalation of effect upon a House's "win percentage values" as applied to such TN's & WN's within the applicants' process for play.

It is another principle objective of the present method for No Dealer Hand "21" to provide a wholly new paradigm of thought provoking play that competently coincides with accepted mathematical mechanics and procedures regarding applied probabilities of chance as applied through the additional adaptation of an optional commissionable percentage fee solution being exacted upon certain TN's and/or WN's outcomes.

It is still another principle objective of the present method for No Dealer Hand "21" to provide for the engagement of optional Push Numbers comprising any numbers from 12 up to 20 that can be expanded or retracted numerically to affect the available pool of Trigger Numbers supporting the House's core margin Vig-advantage, resulting from the applicants' process for play.

It is still another principle objective of the present method for No Dealer Hand "21" to provide for the engagement of Winning Numbers numerating up to 21 that can be expanded or retracted numerically to affect the available pool of both Trigger Numbers and Push Numbers alike supporting the House's core margin Vig-advantage resulting from the applicants' process for play.

It is still yet another principle objective of the present method for No Dealer Hand "21" to provide for the uses of Primary & Secondary play action sets of Trigger Numbers, Push Numbers and Winning Numbers comprising any numbers from 12 up to 21 that can be expanded or retracted numerically, and/or loosen or tighten on a percentage basis, even on the fly of play action, to regulate the House's operational win/lose cycle, whereby benefiting said House's subsequent operational "win percentage values" from such TN's, PN's & WN's in uses during play to also include a broad spectrum of optional Secondary "Proposition" Multi-Down plays being offered through the applicants' play action dynamic.

It is still yet another principle objective of the present method for No Dealer Hand "21" to provide for the "additional proprietary adaptations" of Secondary Proposition types of Multi-Down play action events offering much higher payoffs being projected through the Integrated core mathematics of the applicants' card play methodologies.

It is still yet another objective of the present method for No Dealer Hand "21" to provide for a redefined adaptation for Surrender, as an option of play, that functions in play action as a "stand off" solution alternative for an initially dealt Two (2) card Stiff hand of less than the first Trigger number being applied in play action.

It is still yet another objective of the present method for No Dealer Hand "21" to provide for an additional assortment of ancillary "Ante" wager type side-bets for bonus payoffs, upon the outcome of the first Two (2) cards of a hand being dealt from which players can choose.

It is yet still another objective of the present method for No Dealer Hand "21" to provide for an additional assortment of ancillary "Ante" wager type side-bets for bonus payoffs, upon the outcome of the first Three (3) cards of a hand being dealt from which players can choose.

It is even another objective of the present method for No Dealer Hand "21" to provide casinos' with a gaming mechanism that can be manipulated to result in a more sublime manner, while ameliorating the affects upon a patron's Time-In-Play.

Another consideration regarding the applicants' process for No Dealer Hand "21" is to make their gaming modifications available for application into an encompassing electronic video display unit or third party hand held wireless devices and the like (not shown), whereby a more complete and "sensitive" scale of Trigger Numbers being comprised, from Twelve (12) up to Twenty (20) can be used for either or both of the Primary and/or Secondary "Base" Trigger Number selections or Secondary "Proposition" TN selections being applied, along with the application of optional Push Numbers being comprised from Twelve (12) up to Twenty (20), and Winning Numbers numerating up to Twenty-One (21), all of which synergize together, even on the fly of play action!

DESCRIPTION OF DRAWINGS

The foregoing features, advantages and other objectives of the applicants' methodologies and modifications will become even more clearly understood from the following flow of decision chart embodiments for progressive events as taken in conjunction with the accompanying "description of counsels" (rules for play options) encompassing any Table gaming and/or Electronic video or wireless gaming display apparatuses being applied for the same.

FIG. 6*a* Illustrates a first exemplary counsel embodiment for play action with their predetermined payoffs.

FIG. 6*b* Illustrates a continuing first exemplary counsel embodiment for play action with their predetermined payoffs.

FIG. 7*a* Illustrates a second exemplary counsel embodiment for play action with their predetermined payoffs.

FIG. 7*b* Illustrates a second continuing exemplary counsel embodiment for play action with their predetermined payoffs.

FIG. 7*c* Illustrates a second continuing exemplary counsel embodiment for play action with their predetermined payoffs.

FIG. 8*a* Illustrates a third exemplary counsel embodiment for play action with their predetermined payoffs.

FIG. 8*b* Illustrates a third continuing exemplary counsel embodiment for play action with their predetermined payoffs.

FIG. 8*c* Illustrates a third continuing exemplary counsel embodiment for play action with their predetermined payoffs.

DETAILED DESCRIPTION OF EXEMPLARY EMBODIMENTS

Figure 1:
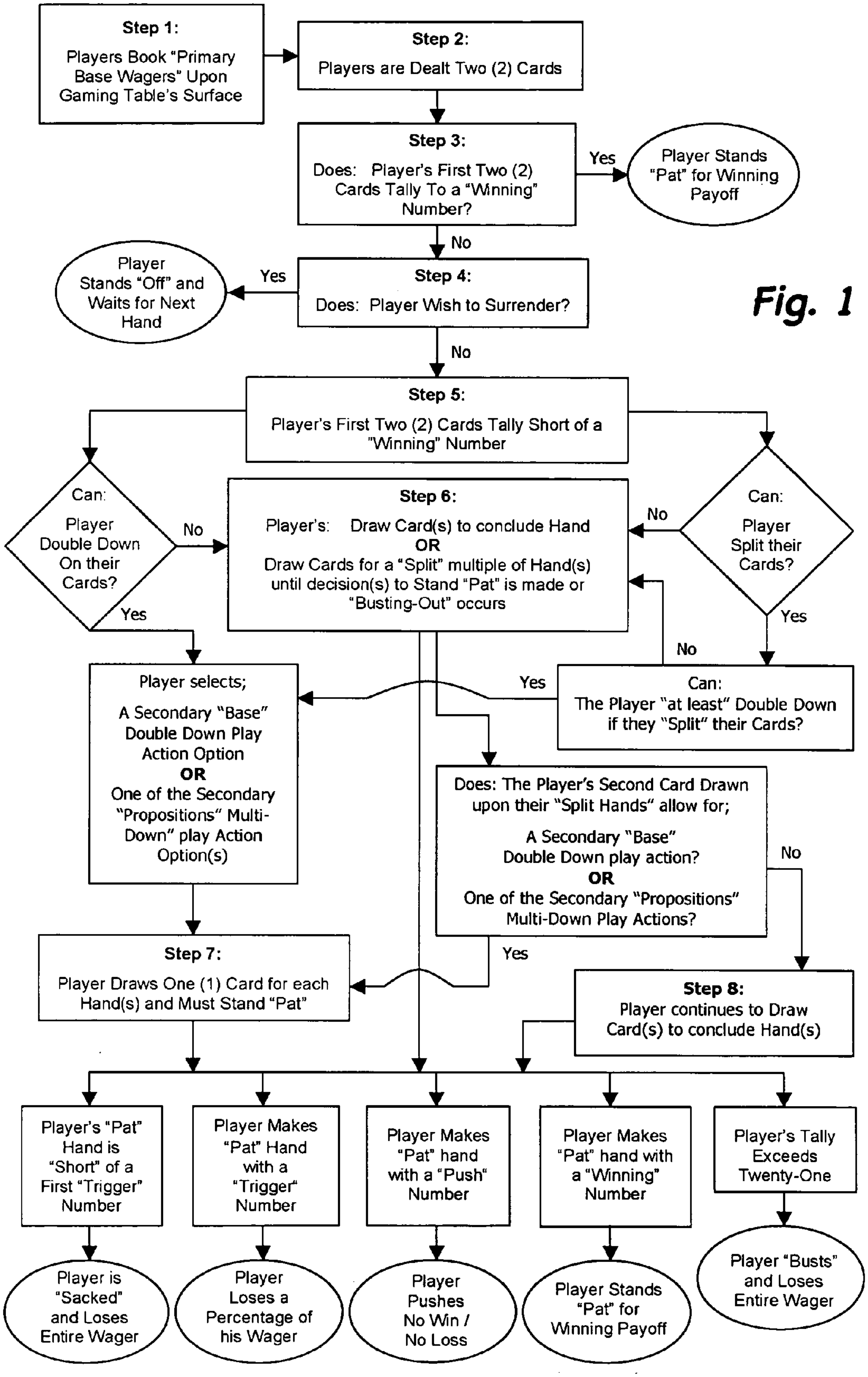
FIG. 1 Illustrates the general flow of progressive event/decisions to complete a round for the table game version of No Dealer Hand "21".
Figure 2:
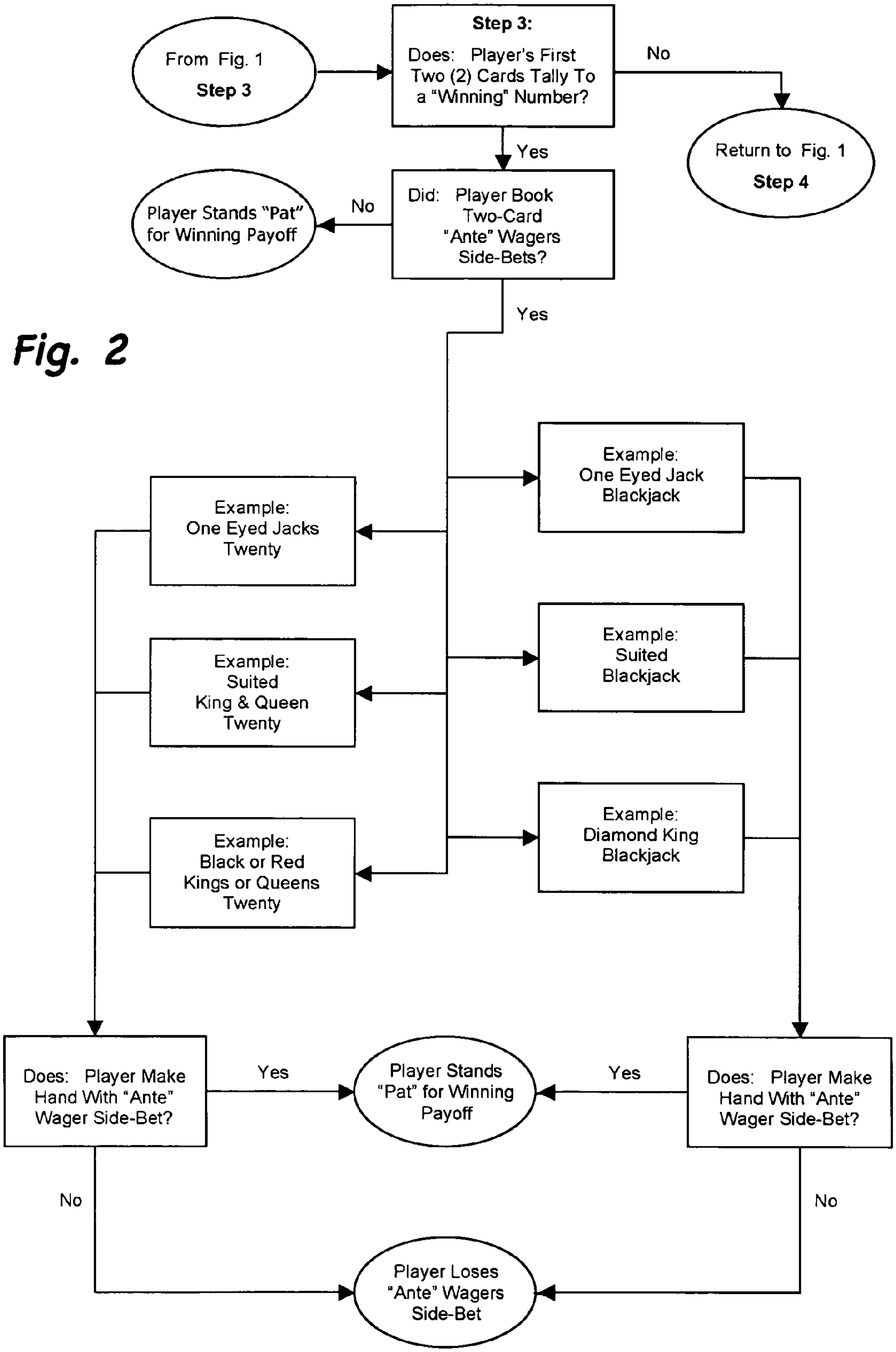
FIG. 2 Illustrates some of the options for a first, Two (2) card ancillary "Ante" type wager side-bets being made available.
Figure 3:
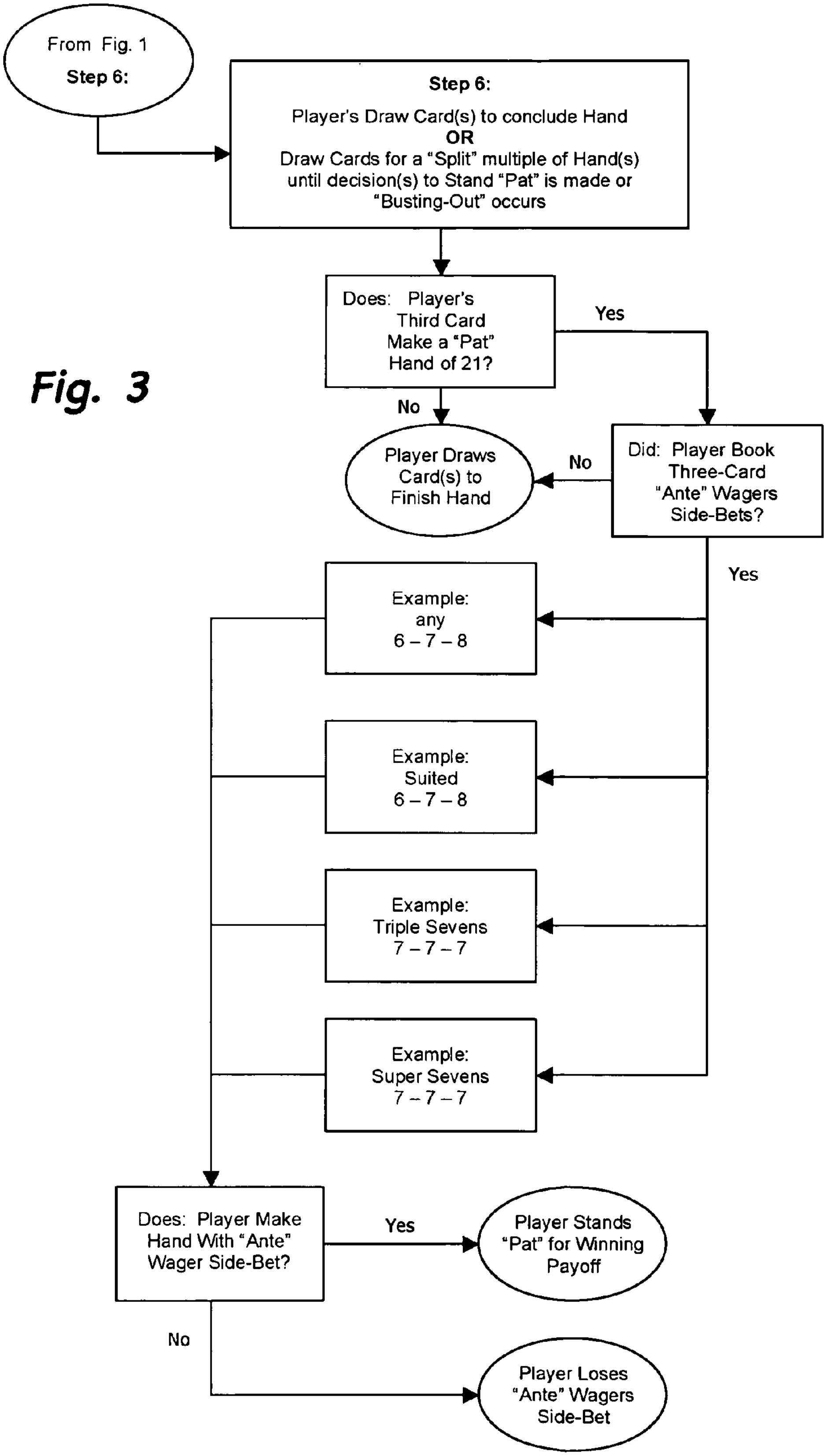
FIG. 3 Illustrates some of the options for a first, Three (3) card ancillary "Ante" type wager side-bets being made available.

In referring to the drawings as illustrated, it shall be understood that the combined entities of FIGS. 1 through 8*c* inclusively are exemplary embodiments of the applicants' gaming methodology. As such, any and all of the Trigger Numbers, Push Numbers and Winning Numbers as selected, discussed and/or illustrated are subject to change at the whim and purpose of the sponsoring organization (casino).

This pertains to their numerical associations to one another as well as their established Vig-advantages, even as assigned on the fly of random algorithmic design by Housemasters. Likewise, all methods for public access to the applicants' "No Dealer Hand" gaming solution, be they "live action", electronic video, wireless communications, mobile Internet devices or otherwise, represent anticipated deployment avenues for this game.

Therefore upon the booking of a required minimum contract wager and optional "Ante" wager side-bets being offered, a new hand begins with the acquisition of the player's first Two (2) cards. Next, each player assesses their first Two-cards to discover if a first Two-card winning hand tally exists, including any Two-card winning ancillary "Ante" wager side-bets having been made as shown from Step 3 of FIG. 2.

Figure 4:
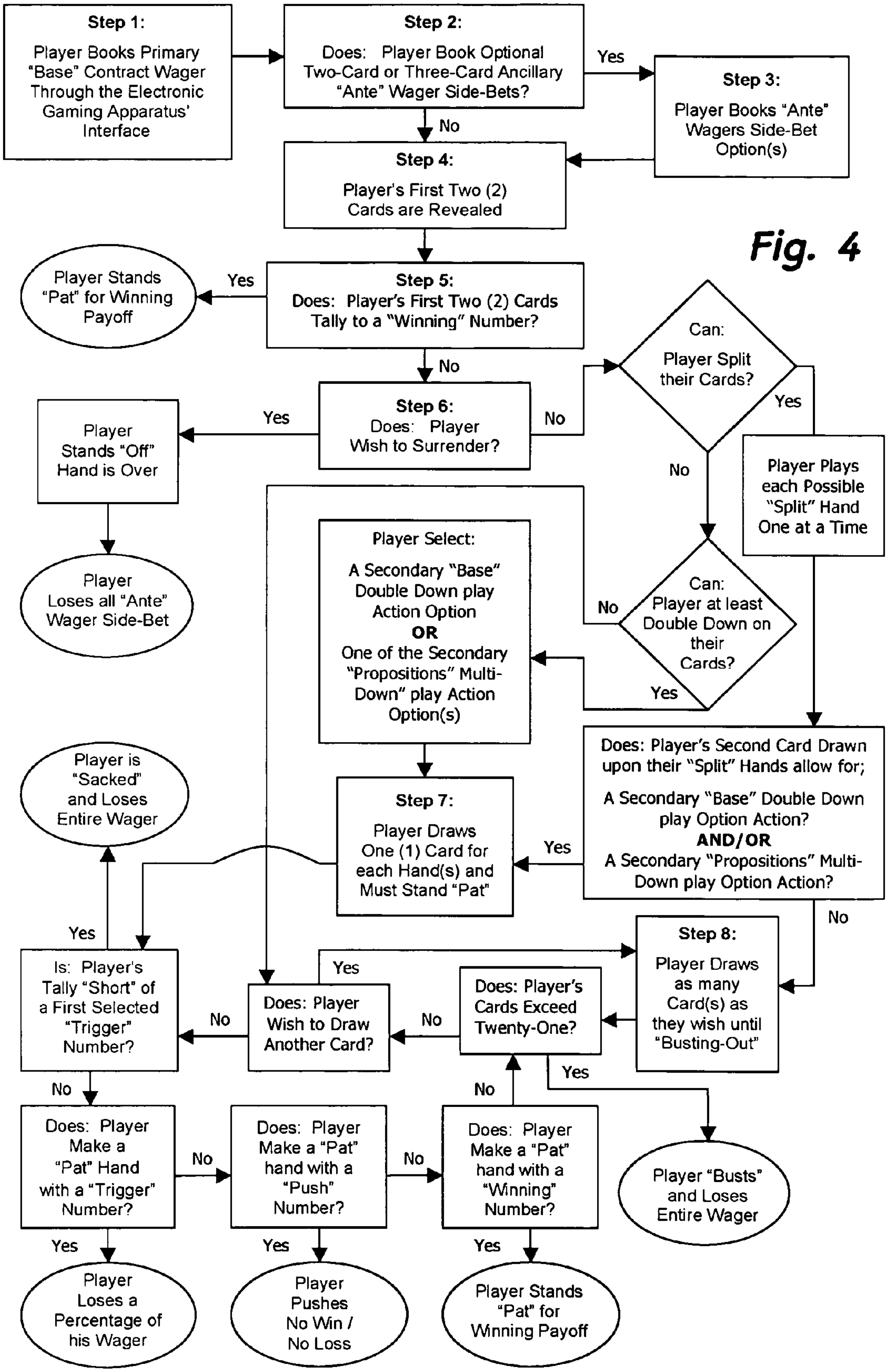
FIG. 4 Illustrates the detailed flow of progressive event/decisions to complete a round for an electronically mechanized and/or wireless device version of No Dealer Hand "21".

If not, then a decision to Surrender may be considered should that option be available to the player, as illustrated in Step 4 and Step 6 of FIGS. 1 & 4 respectively. In the absence of an immediate winning hand count tally outcome or a desire to Surrender their hand, players will likely be compelled to draw at least One (1) card as to at least avoid being "sacked." Furthermore, on the one hand, since the players main motivation is to acquire a winning hand tally of Twenty-one, a player might well bypass other play options drawing cards as they see fit without Busting to achieve such ends as illustrated in FIGS. 1, 4 & 5.

Indeed, on the other hand, the general decision to draw card(s) can come with additional possibilities for players to either Split their cards if the players holds a pair of equally valued cards, usually but not limited to, Ten cards or Aces, Double-Down on their cards assuming their first Two-cards warrant such an action, or both Split and Double-Down or even take similar actions for higher risk/reward "winning" payoffs when booking upon one of the game's Secondary Propositions Multi-Down play action options.

Figure 5:
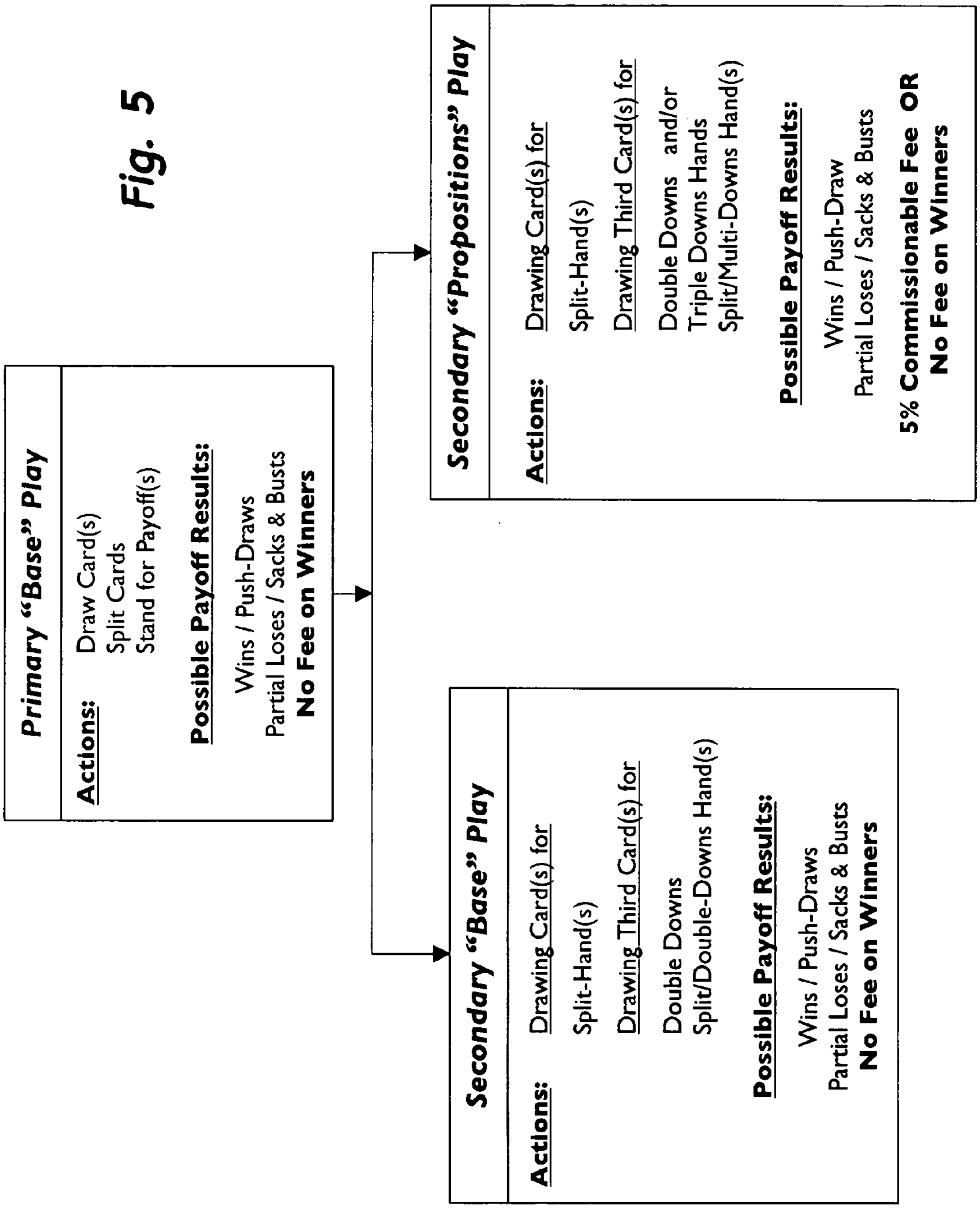
FIG. 5 Illustrates the collective Primary and Secondary play actions for No Dealer Hand "21".

FIGS. 1, 4 & 5, clearly show the flow of progressive events illustrating the player's option to draw card(s) as they see fit without Busting, as well as the player's incumbent need to "Stand Pat" if the player draws the One (1), and usually only One (1), card allowed for either an initial Secondary Base Double-Down action and/or Secondary Proposition Multi-Down actions, as clearly illustrated in FIGS. 1, 4 & 5 respectively. Additionally, since a winning hand count tally often shows upon the draw of a Third card, play action can also be inclusive of a Three-card ancillary Ante wager side-bet if initially booked, as illustrated in Step 6 of FIG. 3, respectively.

Consequently, FIGS. 1 & 4 also illustrate the consequences of not acquiring a winning hand. As clearly affirmed, if a player Stands Pat with a hand count tally "short" of a first Trigger Number being applied to any play action that is of any Primary or Secondary Base play action variety or, as applied upon any type of Secondary Proposition Multi-Down play action options including all forms of Split-hand play, then players are "Sacked," and lose their entire contract wager as well as any ancillary Ante wager side-bets for the hand they may have booked.

Or, if a player Stands Pat upon a hand count tally of a Trigger Number being applied, such players will lose a "hefty percentage portion" of their contract wagers at risk. And, if players Stand Pat on a hand count tally of an optional Push Number being applied, such circumstance resolves the player's hand count tally as a "Push," again meaning a "no win no lose" outcome for the hand, thereby leaving all Winning Number outcomes to be awarded according to their predetermined payoffs while Busting-out as a total loss all hand count tallies "over 21." Finally, FIGS. 6*a* through 8*c* respectively provide "Exemplary Counsel Embodiments" that unequivocally guide the applicants' intentions for general play action of their No Dealer Hand "21" methodology.

OPERATIONAL ADVANTAGES

Suffice it to say, there has never been the ability to establish such a generous payoff schedule within the core mathematical boundaries of traditional Blackjack. Neither have the applicants' ever personally seen, heard of, or read about the idea of, or even the mere suggestion of applying a commissionable percentage fee Vigorish to be cast upon any kind of wager being booked at a traditional Blackjack table, period.

Not to mention such a payoff schedule also being promulgated by way of the very core margin from a new mathematical formulation & solution for "21" play action which classic "Dealer-Hand Blackjack" methodologies could never have envisioned, accommodated or sustained!

Clearly as the applicants' first discovered and then pursued their notions of using the "lousy Pat hands" of at first Seventeen (17), Eighteen (18) and Nineteen (19) as "strategic replacements" for the sledge hammer effect of the Dealer-Hand in play action, they too were surprised to see just how formidable the impact upon the integrated core mathematics was going to be, as well as what was to come from their rather "obscure formulation" of these Trigger Number Solutions in play action.

Certainly, as thoroughly revealed, the applicants' methodologies and modifications, unlike all others coming before it, provides a significant 50% increase in payoff for a WN outcome of Twenty-One. That is, both outcomes of either a Two-card "Natural" Twenty-One (21) or a multi-card Twenty-One (21) respectively, while optional Push Numbers represent a zero sum loss to the players and Standing Pat upon applicable Trigger Numbers, "never results in the total loss" of a player's contract wager having been made. And all this, is what operates from just the applicants' "Base" play actions.

Regarding the electronic modifications for play, additional advantages of the applicants' process for playing No Dealer Hand "21" will become operational through the encompassing means of an interactive video gaming apparatus as provided for the game. In considering the applicants' modifications as applied to an electronic process for play, a "broader scale" of TN's, PN's & WN's can be utilized due to the fact that regulatory law and the core mathematics of the applicants' methodologies function within an environment of broader mathematical opportunity, and the fact that in mobile wireless or video mode the applicants' gaming process is engaged into a "real time computing environment" wherein the issuance of monetary units (i.e. credits), and therefore their valuations are not constricting upon the play-by-play action of the applicants' process for play.

Meaning there are no human factors slowing the game to figure out what can now be a more "sensitive fractional, even 'mill-age,' addition or deduction" to a player's wager or payoff, when a decision to Stand Pat on the Trigger from Twelve (12) to Twenty (20) for example, is made and no human mistakes in calculating them are possible either! Therefore, a perfectly worthwhile process for engaging the applicants' gaming modifications to the public will be provided through the application of the "singularly intimate" means of an electronic video display apparatus, wireless telecommunications device or the like.

In so doing, the aforementioned broader scale of Trigger Numbers, and/or Push Numbers & Winning Numbers could span a plurality of numbers comprising any numbers from Twelve (12) up to Twenty-One (21) in a most sensitively balanced manner. As such, the Trigger Number affect upon the player within the bounds of an electronic version of the applicants' gaming methodology could encompass for example, a player loss of 100% on all hands under Twelve (12), and 100% loss on the actual 12; 100% on 13; 90% on 14; 80% on 15; 75% on 16 for all wagers at risk Likewise, players could "Push" on 17 & 18, while "Winning" 50% of their wager on 19; 120% on certain 2/card 20's; 200% on Blackjack/21, and 200% on certain 3/card 21's for their wagers at risk, or any such kind of plurality mixture of numbers & percentages being applied.

In overview, we have a mathematical thread comprising the uses of Primary Trigger Numbers: 12, 13, 14, 15 & 16. The Push Numbers of 17 & 18, and the Winning Numbers of 19, 20 & 21 or again, any plurality mix of numbers & percentages thereof, that can even fluctuate "on the fly" for manipulative play! Similarly, there can be an entire Secondary selection of TN's, PN's & WN's, working amidst all Secondary Base Double Down play actions and/or Secondary Proposition Multi-Down actions as well. Another "value added" aspect of the video application process is the ability to string any number of video units and/or wireless hand held devices together across any geographical locality supporting any number of ancillary "Ante" wager type Side-bets and/or batteries of progressive "jackpot" opportunities, not to mention all the tournament play possibilities!

Most notably, the applicants' TN, PN & WN process of play provides for a key unexpected benefit for both players and casinos alike, wherefore a credible balance between the casino's necessary House Vig-advantage and a player's exposure to it, is definitely made a palatable one.

This is directly due to the ameliorating manipulations of the entirety of the applicants' Primary and/or Secondary Base & Proposition Trigger Number selections and/or group/sets, Primary and/or Secondary Base & Proposition Push Number selections and/or group/sets, as well as the Winning Number selections and/or group/sets as has been thoroughly described and illustrated above, therein producing a ready potential for much improved payoff ratios from this newly integrated core mathematical thread and its powerful gaming dynamic.

As for the gaming industry, casinos can once again offer their patrons an exciting "companion" option to traditional Blackjack that is simple to grasp and will prove to be even more generous to their patron's Time-In-Play.

Likewise, the applicants' process of play either in its table gaming format or its interactive electronic format, provides a solution that not only supports richer incentives for a patron's play action, but indeed, the applicants' methodology will very likely simultaneously propagate a significantly "fatter" Win % value for Housemasters as well by drawing out much larger sums of capital across its play action environment(s) in even shorter spans of time.

Another significant result of the applicants' process for No Dealer Hand "21" works to restrain the affect of card counting by "directly frustrating" the practical functionality of known card counting techniques and strategies due to the direct extraction of the Dealer hand "affect" upon the game. And, this is further complemented by the speedy characteristics of the applicants' game's play action game pace!

Also, benefiting Housemasters when moving forward with the applicants' gaming process is the quality and therefore value, weight & impact of the organized "group think" presently being propagated by the "Basic Strategy player class" upon the traditional Blackjack franchise that is now being largely, yet not entirely, reduced to guessing . . . .

To appreciate this is to know that the player's relationship to the cards is now "more than less a 'static' one," to the Six (6), Eight (8) or whatever number of deck shoe being used, and not to the Dealer's hand "affect" directly. An affect, that represents the most salient purpose for and focus upon essentially every effective card counting system known.

Moreover, from the player's continuum perspective, the applicants' featured solutions advocating a "No Dealer Hand" play action approach to the game at long last satiates the single greatest long suffering problem engulfing the play of classic Blackjack, that long suffering problem being the players' chances of surviving the continuum's unending onslaught of "detestably hot" Blackjack Dealer hands!

Because now, there simply isn't one . . .

We claim:

1. A method for establishing a no dealer hand twenty-one style gaming process using at least one common deck of fifty-two physical playing cards for application to a wholly new play action concept, resulting in the provision of a more mathematically malleable core margin variance, directly benefiting housemasters and players thereof, comprising:

said gaming process utilizing the at least one common deck of fifty-two physical playing cards for uses in a no dealer hand process of twenty-one style play action;

said gaming process having each player placing an initial base contract wager to play the game;

having said each player receive an initial physical two-cards to establish an initial first two-card hand count tally of up to twenty-one for play action;

awarding all first two-card winning hand count tallies according to predetermined payoffs;

having said each player assess their said initial first two-card hand count tallies for a decision to stand pat, or to draw additional cards to pursue play action;

said gaming process having said no dealer hand and using a trigger number means as a replacement for a dealer's hand amidst play action, wherein said trigger number means substantially comprises any numbers from twelve up to twenty;

awarding all hand count tallies of three or more cards according to predetermined payoffs responsive to said player standing upon any applied trigger number, push number or winning number being used in play from said trigger number means;

settling all sacked hand count tallies, short of a first applied trigger number being used, as wins for the house;

and settling all said hand count tallies busting over twenty-one as wins for the house.

2. An electronically mechanized gaming method for playing a modified game of twenty-one having no dealer hand in play action while a modified game process is encompassed within an electronic gaming apparatus utilizing an electronic simulation of a common deck of playing cards for play of the same, all of which results in the provision of a new core margin solution directly supporting both significantly increased payoffs as well as time-in-play for players, comprising:

said modified game process functioning, via the gaming apparatus, to display the electronic simulation of the common deck of fifty-two playing cards and to provide a singularly intimate electronic gaming process to play the modified game of no dealer hand twenty-one;

with, said electronic gaming process utilizing said electronic simulation of said common deck of fifty-two playing cards, via said gaming apparatus, to display a first two-cards of an initial two-card hand count tally of up to twenty-one;

also, said electronic gaming process operating, via said gaming apparatus, to display said first two-cards of said initial two-card hand count tally of up to twenty-one and to award all first two-card winning hand count tallies being revealed according to predetermined payoffs;

said electronic gaming process allowing players to draw additional cards to pursue further play action of the game;

with, said electronic gaming process having a trigger number means being used, via said game apparatus, from twelve up to twenty to replace a dealer's hand in play action;

and, said electronic gaming process allowing players to draw at least one additional card for making a hand count tally that avoids being sacked by said hand count tally of less than a first primary trigger number selection being applied in play action;

also, said electronic gaming process having an optional push number means being used, via said game apparatus, from twelve up to twenty to replace said dealer's hand in play action;

with, said electronic gaming process allowing said players to draw at least one additional card for making said hand count tally that avoids being pushed by said hand count tally of an optional first push number selection being applied in play action;

also, said electronic gaming process operating, via-said electronic gaming apparatus, to award all winning hand tallies of three or more cards being revealed according to predetermined payoffs;

with, said electronic gaming process, settling all sacked hand count tallies, short of said first primary trigger number selection being applied, as wins for the house;

and said electronic gaming process settling all busting hand count tallies over twenty-one as wins for the house.

3. The method of claim 2, further includes said electronic gaming process, as utilizing a secondary trigger number selection being applied, from twelve up to twenty for the manipulation of at least a secondary base selection of play actions.

4. The method of claim 2, further includes said electronic gaming process, as utilizing a secondary trigger number selection being applied, from twelve up to twenty for the manipulation of a secondary proposition type multi-down play action.

5. A method for playing twenty-one, engaging the use of at least one common deck of fifty-two physical playing cards, resulting in the provision of a more mathematically malleable core margin variance being distributed in play action, comprising the steps of:

(a) dealing play action for a twenty-one style game having no dealer's hand in play;

(b) allowing players to make an initial primary base contract wager for play action;

(c) allowing said players to make additional ancillary ante wager side-bets for play action;

(d) dealing all players physical two-cards for an initial two-card hand count tally of up to twenty-one;

(e) settling all first two-card winning hand count tallies according to predetermined payoffs;

(f) allowing said all players an option to stand pat, or draw at least one additional physical playing card until busting, for pursing all forms of play actions;

(g) allowing said players to split at least said initial two-card hand count tally, before taking additional physical playing cards, to play out the hands of such said primary base contract wagers for play action;

(h) allowing said players to at least double down on said initial two-card hand count tally, before taking a third-card, for playing out their hand upon a selection of secondary decision choices for play action;

(i) having said players without said first two-card winning hand count tallies to draw at least one additional physical playing card and to avoid being sacked for a complete loss with a hand count tally, of less than a first trigger number being used, from at least a first primary level of trigger numbers being applied, for play action;

(j) having said players standing pat upon said hand count tally, of at least said first trigger number being used, from at least said first primary level trigger numbers being applied, to at least said primary base action of play, lose a hefty portion of said primary base contract wager for the hand;

(k) having said players without a said first two-card winning hand count tallies, to draw said at least one additional card, to avoid standing pat with a push number hand count tally, of a first push number being used, from at least a first primary level push numbers being applied, for play action;

(l) having said players standing pat upon said hand count tally, of at least a said first trigger number being used, from a secondary level of trigger numbers being applied, in completion of any secondary decision action, lose a hefty portion of their secondary decision's contract wager for the hand;

(m) settling all winning primary hand count tallies of three or more cards according to predetermined payoffs;

(n) settling all sacked hands short of a said first trigger number being used, as a complete loss of a player's wagers;

(o) settling all winning secondary decision hand tallies of three or more cards according to predetermined payoffs;

(p) settling all busted hands over twenty-one, as a complete loss of a player's wagers.

6. The method of claim 5, further includes said additional ancillary ante wager side-bets, of step (c) as being, both a first two-card or a first three-card outcomes for a hand.

7. The method of claim 5, further includes said initial two-card hand tally, of step (g) as being, any matched pair of cards.

8. The method of claim 5, further includes said players to split at least their said initial two-card hand tally, of step (g) as also applying to any secondary decision, split double-down or split multi-down wagers being booked for play action.

9. The method of claim 5, further includes said at least double down on their said initial two-card hand count tally, of step (h) to substantially comprise, any two-cards for play action.

10. The method of claim 5, further includes said at least double down on their said initial two-card hand count tally, of step (h) to substantially comprise, any secondary base or proposition type of play action.

11. The method of claim 5, further includes said first primary level of trigger numbers being applied, for play action of step (i) to substantially comprise, an additional selection of secondary level trigger numbers being applied in play action.

12. The method of claim 11, further includes said first primary level of trigger numbers being applied, for play action of step (i) to substantially comprise, a plurality of numbers ranging from twelve to twenty.

13. The method of claim 5, further includes the loss of said hefty portion of their said primary base contract wager, of step (j) to substantially comprise, any amount short of a total loss of the player's said primary base contract wager.

14. The method of claim 5, further includes said at least first primary level of push numbers being applied, for play action of step (k) to substantially comprise, a plurality of numbers ranging from twelve to twenty.

15. The method of claim 14, further includes said at least first primary level of push numbers being applied, for play action of step (k) as all being, optional.

16. The method of claim 5, further includes the loss of said hefty portion of their secondary decision's contract wager, of step (l) to substantially comprise, any amount short of a total loss of the players secondary decision's contract wager.

* * * * *

UNITED STATES PATENT AND TRADEMARK OFFICE

CERTIFICATE OF CORRECTION

PATENT NO. : 8,308,540 B1
APPLICATION NO. : 12/798864
DATED : November 13, 2012
INVENTOR(S) : Hedge, Jr. et al.

It is certified that error appears in the above-identified patent and that said Letters Patent is hereby corrected as shown below:

In the Claims

Column 20, Claim 1, Lines 64 to 65, Delete "from said trigger number means";

Signed and Sealed this
Fourth Day of June, 2013

Teresa Stanek Rea
*Acting Director of the United States Patent and Trademark Office*